United States Patent
Belz et al.

(10) Patent No.: US 8,548,523 B2
(45) Date of Patent: Oct. 1, 2013

(54) METHODS, APPARATUS, AND COMPUTER PROGRAM PRODUCTS FOR CHANGING RING METHOD BASED ON TYPE OF CONNECTED DEVICE

(75) Inventors: Steven M. Belz, Cedar Park, TX (US); Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 438 days.

(21) Appl. No.: 12/496,253

(22) Filed: Jul. 1, 2009

(65) Prior Publication Data
US 2011/0003587 A1    Jan. 6, 2011

(51) Int. Cl.
*H04B 1/38* (2006.01)
(52) U.S. Cl.
USPC ........ 455/557; 455/558; 455/552.1; 455/90.2
(58) Field of Classification Search
USPC ............ 455/414.1, 456.1, 569.1, 456.3, 574, 455/557, 558, 552.1, 90.2
See application file for complete search history.

(56) References Cited

U.S. PATENT DOCUMENTS

| | | | |
|---|---|---|---|
| 4,578,542 A * | 3/1986 | Alderman | 379/376.01 |
| 5,557,653 A | 9/1996 | Paterson et al. | |
| 7,519,399 B2 | 4/2009 | Suzuki | |
| 7,649,456 B2 * | 1/2010 | Wakefield et al. | 340/539.13 |
| 7,912,503 B2 * | 3/2011 | Chang et al. | 455/557 |
| 2002/0010008 A1 * | 1/2002 | Bork et al. | 455/567 |
| 2006/0164980 A1 * | 7/2006 | Guru | 370/229 |
| 2006/0256938 A1 * | 11/2006 | Ruckart | 379/88.19 |
| 2007/0270129 A1 * | 11/2007 | Luo | 455/414.1 |
| 2008/0113689 A1 * | 5/2008 | Bailey | 455/569.1 |
| 2009/0088138 A1 * | 4/2009 | Jung et al. | 455/414.1 |
| 2009/0088207 A1 | 4/2009 | Sweeney et al. | |
| 2009/0143114 A1 * | 6/2009 | Vargas et al. | 455/574 |
| 2009/0170532 A1 * | 7/2009 | Lee et al. | 455/456.3 |
| 2009/0174759 A1 * | 7/2009 | Yeh et al. | 348/14.01 |
| 2010/0317371 A1 * | 12/2010 | Westerinen et al. | 455/456.6 |

FOREIGN PATENT DOCUMENTS

| | | |
|---|---|---|
| EP | 1725057 A1 | 11/2006 |
| WO | WO2005064903 A1 | 7/2005 |

OTHER PUBLICATIONS

X10Pro Touch-Tone Controller Model PHC05, 1999.*
X10Pro Chime Module.*

* cited by examiner

*Primary Examiner* — Kent Chang
*Assistant Examiner* — William Lu
(74) *Attorney, Agent, or Firm* — Cantor Colburn LLP

(57) ABSTRACT

Methods, apparatus, and computer program products for changing alert setting of a communication device are provided. An operative connection of a communication device to a connected device is detected. Based on the operative connection to the connected device, it is determined whether an alert setting for the communication device should be changed. In response to determining that the alert setting should be changed, the alert setting for the communication device is automatically changed. The connected device is a network interface, a power adapter, and/or a headset.

10 Claims, 6 Drawing Sheets

METHODS, APPARATUS, AND COMPUTER PROGRAM PRODUCTS FOR CHANGING RING METHOD BASED ON TYPE OF CONNECTED DEVICE

BACKGROUND

Exemplary embodiments relate to, but are not limited to, changing the ring method of a communication device based on the type of device connected to the communication device.

Communication devices are continually increasing in popularity and have become an integral part of society. Such communication devices include, for example and without limitation, mobile telephones, landline telephones, smart telephones, soft telephone, personal digital assistants, set top box (STB), television (TV), game console, MP3 player, and computers. Communication devices generally output some type of notification alert to indicate to a user that a communication (such as a call or message) is arriving or has arrived. Such notification alerts may have any of a variety of characteristics, including silent notification characteristics (e.g., vibration or visible indication) and audible notification characteristics (e.g., a variety of ring tones).

BRIEF SUMMARY

Exemplary embodiments include a method for changing an alert setting of a communication device. An operative connection of a communication device to a connected device is detected. Based on the operative connection to the connected device, it is determined whether an alert setting for the communication device should be changed. In response to determining that the alert setting should be changed, the alert setting for the communication device is automatically changed. The connected device is a network interface, a power adapter, and/or a headset.

Exemplary embodiments include a method for changing an alert setting of a communication device. A notification is received at a communication device. In response to receiving the notification, an alert setting of the communication device is automatically changed from a non-audible setting to an audible setting, and a volume of the audible setting is automatically increased.

Exemplary embodiments include a method for changing an alert setting of a communication device. It is determined that there is no motion. Determining that there is no motion includes recognizing that there is no motion around a communication device and/or recognizing that there is no motion of the communication device. It is determined whether a period of time for no motion meets a threshold. In response to the period of time for no motion meeting the threshold, an alert setting of the communication device is automatically changed from a non-audible setting to an audible setting.

Exemplary embodiments include a communication device configured to change an alert setting for the communication device. An alerter module is configured to automatically change an alert setting of a communication device. A processor is configured to execute to computer-executable instructions of the alerter module. In response to the alerter module receiving a notification related to motion, the alerter module is configured to automatically change the alert setting. In response to the alerter module receiving a notification related to uninterruptible programming, the alerter module is configured to automatically change the alert setting. In response to the alerter module receiving a notification related to an operative connection to a network interface, the alerter module is configured to automatically change the alert setting.

Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains exemplary embodiments, together with features, by way of example with reference to the drawings.

DETAILED DESCRIPTION OF EXEMPLARY EMBODIMENTS

Exemplary embodiments provide mechanisms to modify the alert, e.g., ring, characteristics for a communication device based on what type of peripheral device is operatively connected to the communication device and based on notifications received by the communication device.

Figure 1:
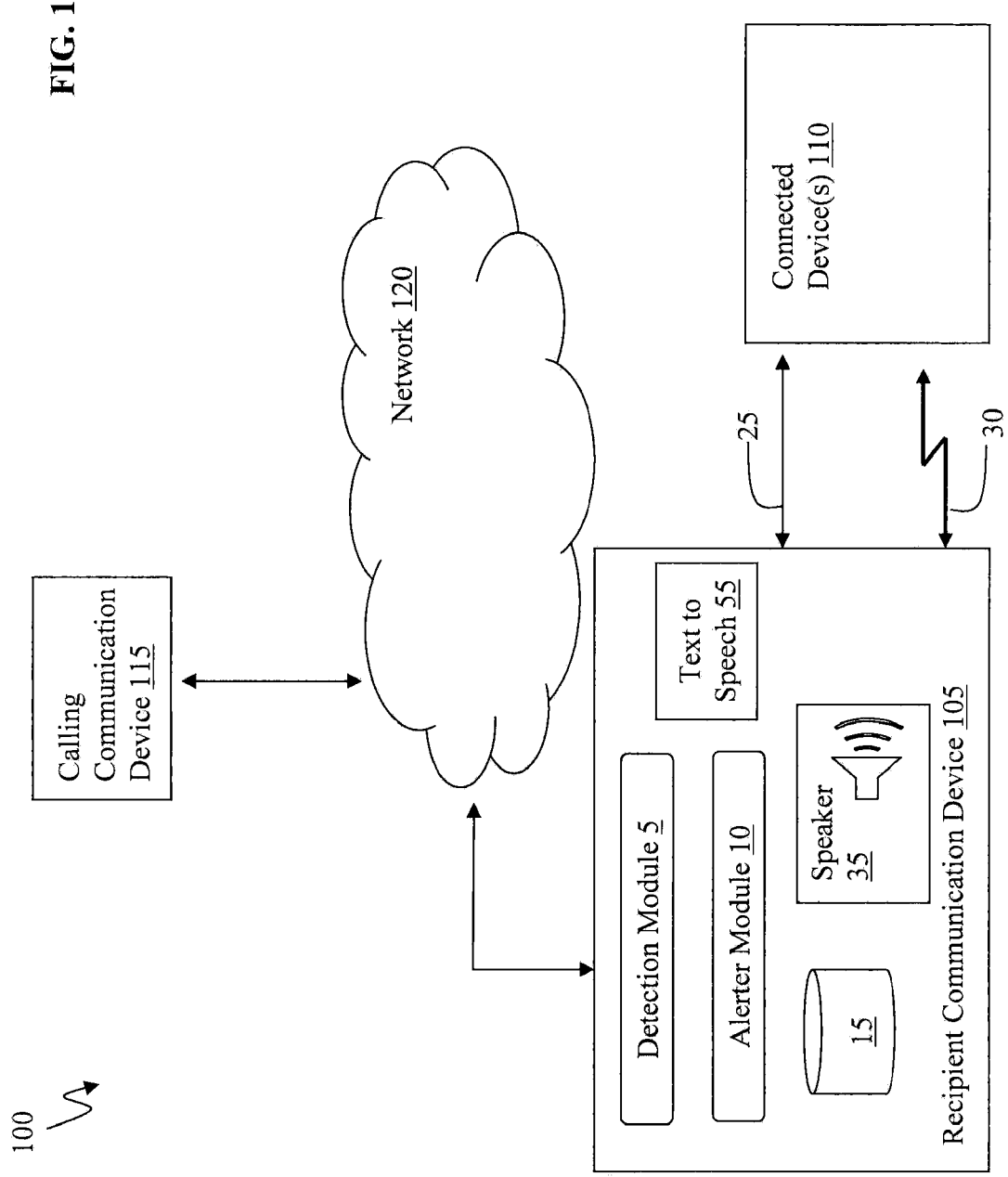
FIG. 1 illustrates a block diagram in accordance with exemplary embodiments.

FIG. 1 illustrates a block diagram 100 in accordance with exemplary embodiments. The block diagram 100 illustrates a communication device 105 operatively connected to a communication device 115 via a network 120. For explanatory purposes, the communication device 105 may be illustrated as a recipient communication device and the communication device 115 may be illustrated as a calling communication device.

In the block diagram 100, the recipient communication device 105 is configured to receive, control, and process communications received from the calling communication device 115 via the network 120. The recipient communication device 105 includes one or more modules, applications, programs, circuits, interfaces, etc., to implement exemplary embodiments to process communications from calling communication device 115 via the network 120. The recipient communication device 105 may include a detection module 5 and an alerter module 10.

The recipient communication device 105 and the calling communication device 115 may be representative of and contain all the software and/or hardware to function and operate as mobile communication device, mobile telephones, landline telephones, smart telephones, soft telephone, Session Initiation Protocol (SIP) telephones, Voice over Internet Protocol (VoIP) telephones, personal digital assistants, and computers. Further, the recipient communication device 105 and the calling communication device 115 may be representative of computer processing devices including one or more processors configured to execute computer readable instructions stored in memory and configured to implement the necessary operations, functions, methods, and logic discussed herein. For example, recipient communication device 105 and the calling communication device 115 may be representative of an IPHONE® by Apple®, a MOTOROLA® communication device, a BLACKBERRY® communication device by RIM, and any other kind of mobile communication device.

Further regarding the network 120, the network 120 may include circuit-switched and/or packet-switched technologies and devices, such as routers, switches, hubs, gateways, etc., for facilitating communications. The network 120 may include wireline and/or wireless components utilizing, e.g., IEEE 802.11 standards for providing over-the-air transmissions of communications. The network 120 can include IP-based networks for communication between a customer service center and clients/users. The network 120 can manage multiple accounts as established by particular users. These accounts may then be used to provide access to services as described herein.

Also, the network 120 may include wireline and/or wireless components utilizing standards, e.g., multimedia messaging services (MMS). The network 120 may include a multimedia messaging center (MMC), which implements the network side of multimedia messaging service (MMS) and makes it possible for an operator to offer multimedia messaging to mobile communication device users. The MMC is a highly flexible system, which can be adapted to the needs of the operator and the particular end users involved. The MMC manages different sources to/from mobile terminals, supporting a wide range of standard interfaces.

According to exemplary embodiments, the network 120 may facilitate transmission of media, e.g., images, video, data, multimedia messaging, etc., from content services provider systems to customers/users via devices. In exemplary embodiments, the network 120 can include a managed IP and/or wireless network administered by a service provider, which can control bandwidth and quality of service for the communications discussed herein. The network 120 may be implemented in a wireless fashion, e.g., using wireless protocols and technologies, such as WiFi, WiMax, BLUETOOTH, etc. The network 120 can also be a packet-switched network, such as a local area network, a wide area network, a metropolitan area network, an Internet network, or other similar types of networks. The network 120 may be a cellular communications network, a fixed wireless network, a wireless local area network (LAN), a wireless wide area network (WAN), a personal area network (PAN), a virtual private network (VPN), an intranet or any other suitable network, and the network 120 may include equipment for receiving and transmitting signals, such as a cell tower, a mobile switching center, a base station, and a wireless access point.

As a non-limiting example, the calling communication device 115 may place a telephone call or send a message to the recipient communication device 105 over the network 120. In one example, the alerter module 10 may cause a speaker 35 to output an audible alert, such as ringing with a ring tone.

In exemplary embodiments, the user of the recipient communication device 105 may operatively connect one or more connected devices 110 to the recipient communication device 105. For example, the connected device 110 may be operatively connected to the recipient communication device 105 by a wired connection 25 and/or by a wireless connection 30. The user of the recipient communication device 105 may be alerted of an incoming communication, such as a telephone call or message, on the connected device 110. For example, the connected device 110 may ring to alert the user of the incoming communication.

In accordance with exemplary embodiments, the user may desire to have a different alert when the recipient communication device 105 is connected to the connected device 110. In exemplary embodiments, the detection module 5 is configured to determine if any connected device 110 is coupled to the recipient communication device 105. Also, the detection module 5 is configured to determine what type of connected device 110 is coupled to the recipient communication device 105. For the sake of illustration, the connected device 110 may include headsets, such as a BLUETOOTH earpiece, external speakers, etc. The alerter module 10 is configured to provide an alert to the connected device 110 that is different from the alert provided to the recipient communication device 105 based on the type of connected device 110. The user of the recipient communication device 105 can configure the alerter module 10 for many different types of connected devices 110 as discussed herein.

In exemplary embodiments, the alerter module 10 can be configured to present one alert for the recipient communication device 105 via the speaker 35 and a different alert for the connected device 110. In a non-limiting example, the user may receive an incoming call or message at the recipient communication device 105 from the calling communication device 115. The detection module 5 recognizes that the connected device 110 is operatively coupled to the recipient communication device 105, and outputs this information to the alerter module 10. The alerter module 10 extracts the proper alert for the connected device 110 from a database 15. Although the recipient communication device 105 would normally ring through the speaker 35 to alert the user if the connected device 110 were not connected, in this example the alerter module 10 causes the connected device 110 to alert the user by beeping instead of ringing. Accordingly, exemplary embodiments allow, for example, a beep, or series of beeps, to be heard through the connected device 110 instead of a loud ring or a particular ring tone. Although a ring tone may be pleasant to hear through the speaker 35 of the recipient communication device 105, the same ring tone may by annoying on the connected device 110. As such, the alerter module 10 allows two different alerts for the recipient communication device 105 and the connected device 110, by automatically changing the alert setting of the recipient communication device 105 when the detection module 5 detects the operative connection to the connected devices 110.

Also, the recipient communication device 105 may utilize a text to speech (TTS) converter 55 to convert text of a caller identification and/or phone book entry stored in the database 15 to speech. In exemplary embodiments, based on the recipient communication device 105 being operatively connected to the connected device 110 and/or based on the alerter module 10 receiving a notification from the detection module 5 indicating the operative connection, the alerter module 10 is configured to present an alert to a call or message as speech through the connected device 110 even though an alert setting is set to ring for the recipient communication device 105. For example, prior to being connected and/or when connected to the connected device 110, the user may set the alert setting of the alerter module 10 to ring at the highest alert volume level, which is shown as alert level 9 in FIG. 3. Nevertheless, when an incoming call or message is received at the recipient communication device 105, the alerter module 10 is configured to automatically change the alert setting so that speech, such as the name, telephone number, and/or IP address of the caller is output via the TTS converter 55 through the connected device 110 in place of the loud ring or ring tone. Further, when a name is not available to the caller identification of the recipient communication device 105, the alerter module 10 is configured to automatically search through a stored phone book in the database 15 to find a matching telephone number and/or IP address, and the alerter module 10 causes the TTS converter 55 to speak the corresponding name that matches the telephone number and/or IP address of the caller through the connected device 110, based on the operative connection 25 or 30. Although the user may set an alert setting that sounds pleasant through the speaker 35 of the recipient communication device 35, the alerter module 10 is configured to automatically change the alert setting for the connected device 110 as discussed herein. Additionally, the alerter module 10 can be configured so that the user has the option to override the feature to automatically change the alert setting by the alerter module 10. Further, the user or a default setting may store a voice message to be spoken through the connected device 110 in place of a ring to the connected device 110.

Figure 2:
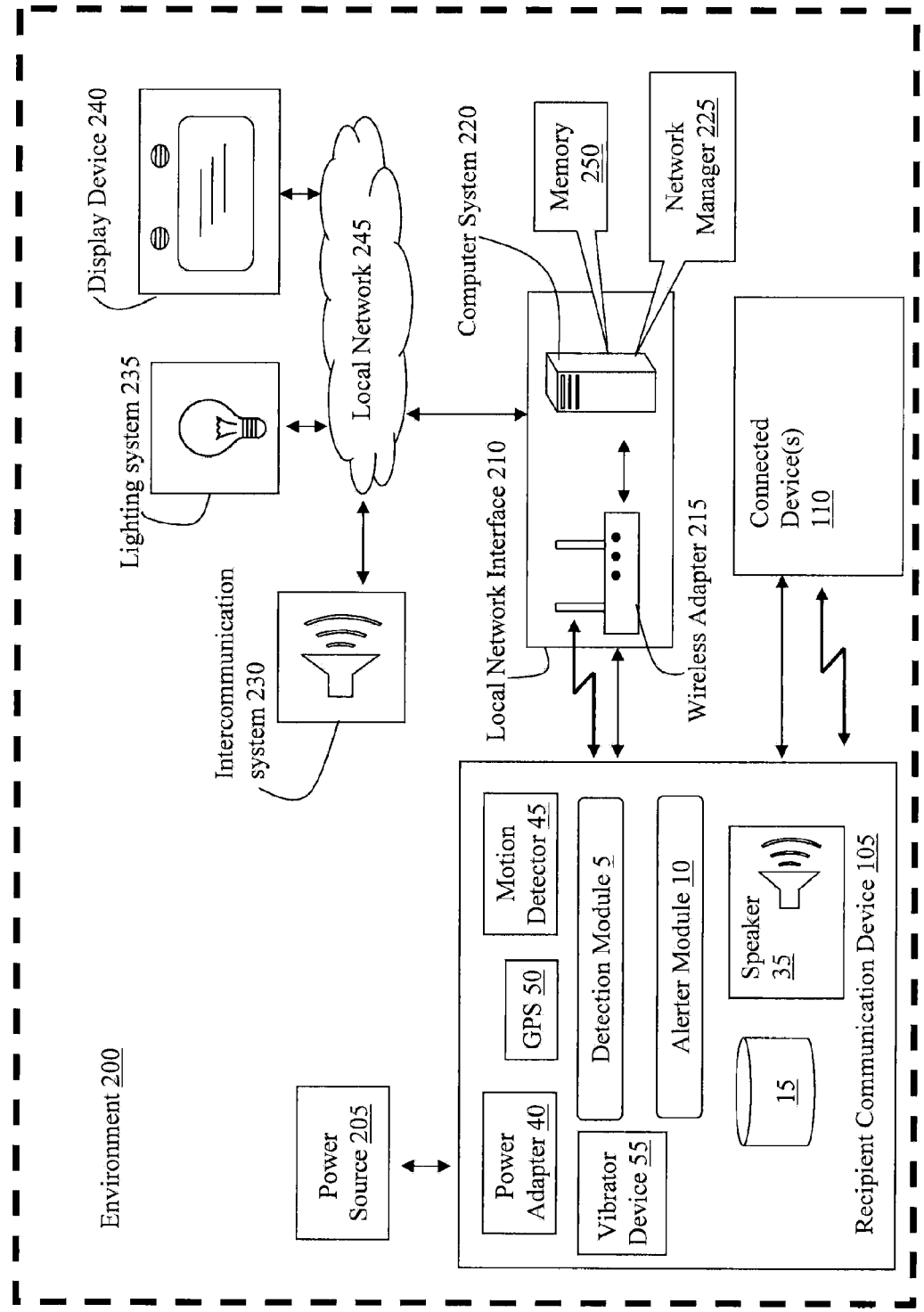
FIG. 2 illustrates an environment in accordance with exemplary embodiments.

FIG. 2 illustrates an environment 200 in accordance with exemplary embodiments. The environment 200 may, for example and without limitation, be representative of offices, homes, vehicles, and/or rooms, and any other suitable environment. In FIG. 2, the various devices in the environment 200 may communicate with one another by utilizing known protocols and standards. For example, the Session Initiation Protocol (SIP) may be utilized to allow multimedia communication in the environment 200. SIP may utilize various commands, such as SIP Notify, SIP Invite, SIP Acknowledge, and others known in the art to communicate in the environment 200. For example, the standards of the Digital Living Network Alliance (DLNA) may be utilized to allow consumer electronics and entertainment devices within the environment 200 to share their content with each other across a home or office network without a complicated configuration process. DLNA is a concept of wired and wireless interoperable networks. Also, Simple Network Management Protocol (SNMP) may be used to allow various devices to communicate in the environment 200, or any other suitable protocols and standards may be used as understood by one skilled in the art.

In a non-limiting example, the detection module 5 may detect that the recipient communication device 105 is operatively connected to a power source 205 to charge the battery (not shown) of the recipient communication device 105. For example, a power adapter 40 of the recipient communication device 105 may be coupled to the recipient communication device 105 and then the plugged into a wall AC power outlet represented as a power source 205, or a mobile power adapter 40 may be plugged into a DC power outlet represented as the power source 205, which may be a cigarette lighter in a vehicle. The detection module 5 is configured to determine the amount of time that power adapter 40 of the recipient communication device 105 is operatively connected to the power source 205. The detection module 5 may detect that the power adapter 40 has been connected to the power source 205 for 15 minutes. Also, the detection module 5 may detect that the power adapter 40 has been connected to the power source 205 for any set predetermined amount of time. For example, if the power adapter 40 has been connected to the power source 205 for 15 minutes, the detection module 5 notifies the alerter module 10. In exemplary embodiments, the detection module 5 can be configured to notify the alerter module 10 after the power adapter 40 has been connected to the power source 205 for any desired amount of time, such as 5, 10, 15, 20, 25, 30, 35, 45, and/or 60 minutes, such as 1 hour, 2 hours, 3 hours, etc., and/or any period of time in between. Also, the detection module 5 is configured so that the user can modify the period of time at which to notify the alerter module 10, e.g., via a suitable user interface. Responsive to the alerter module 10 being notified by the detection module 5 that the recipient communication device 105 has been connected to the recipient communication device 105 for the desired period of time, which is 15 minutes in this example, the alerter module 10 checks and automatically adjusts the alert setting for the recipient communication device 105. For example, the alerter module 10 may determine that alert setting for the recipient communication device 105 is set to a non-audible mode, such as vibrate mode that causes a vibrator device 55 to vibrate, silent mode, screen flash mode, etc. The alerter module 10 can automatically adjust the alert setting of the recipient communication device 105 based on receiving the notification from the detection module 5 that the power adapter 40 has been connected to the power source 205 for 15 minutes. The alerter module 10 changes the alert setting of the recipient communication device 105 from the non-audible mode, such as vibrate, to ring so that the ring can be heard through the speaker 35. Additionally, with reference to FIG. 3, the alerter module 10 is configured to determine an alert volume level 300 of the recipient communication device 105, and the alerter module 10 can increase the alert volume level 300 so that the speaker 35 alerts the user with a louder ring for an incoming call or message. As a non-limiting example, if the alert volume level 300 is set to one-third or below, the alerter module 10 may automatically increase the alert volume level 300 to the highest volume level, to the next to highest volume level, and/or to the volume level above the middle level. Also, in exemplary embodiments, the alerter module 10 may be configured to incrementally increase the alert volume level 300 after each missed incoming call or message. For example, if after the first missed call or message at the recipient communication device 300, the alerter module 10 may increase the volume level 300 from 2 to 3; after the second missed call or message, the alerter module 10 may increase the volume level 300 from 3 to 4; after the third missed call or message, the alerter module 10 may increase the volume level 300 from 4 to 5; after the fourth missed call or message, the alerter module 10 may increase the volume level 300 from 6 to 7; and after the nth missed call or message, the alerter module 10 may increase the volume level 300 to the highest volume level 9. Although the previous example illustrates incrementally increasing the alert volume level 300 by 1, it is understood that the alert volume level 300 may be incrementally increased by 2, 3, 4, etc. after each missed call or message in accordance with exemplary embodiments. Additionally, after each missed call and/or a particular number of missed calls, the alerter module 10 may automatically change the ring tone of the alert setting to a more distinct ring tone. For example, the alerter module 10 may automatically change to ring tone to a very distinct ring tone that can capture the user's attention, along with increasing the alert volume 300, such that the alert can be heard through the speaker 35 and noticed by the user.

Referring to FIG. 2, in exemplary embodiments, the detection module 5 may detect that the power adapter 40 has been connected to the power source 205 for 15 minutes, or any set time like 1 hour, and the detection module 5 may detect that the connected device 110 is operatively connected to the recipient communication device 105. The alerter module 10 is notified of this connection to power source 205 for 15 minutes and connection to connected device 110 by the detection module 5. The alerter module 10 may determine that the connected device 110 is set to beep, ring, chime, etc. when an incoming call or message arrives at the recipient communication device 105. In exemplary embodiments, the alerter module 10 automatically causes any incoming call or message to be alerted through the speaker 35 of the recipient communication device 105 instead of through the connected device 110. As such, if the user places the recipient communication device 105 on a shelf to charge while the recipient communication device 105 is operatively connected, e.g., by operative connection 25 or 35 to the connected device 110, which may be a headset, the alerter module 5 is configured to change the alert from the connected device 110 which may not be heard by the user to the speaker 35 which can be audibly heard by the user, for example, sitting in the room. For example, the incoming call or message would normally cause the user's headset to ring, but the user may not have the headset to his ear although the headset is operatively connected to the recipient communication device 105 as it charges. The alerter module 10 is configured to automatically recognize both the operative connection to the power source 205 for the set period of time, e.g., 15 minutes and the connected device 110, and in response, the alerter module 10 automatically causes the alert to be heard through the speaker 35 not the connected device 110, even if the alert setting is a non-audible setting. Further, when the detection module 5 recognizes that the user has utilized the connected device 110 after the set period of time, which may be 15 minutes, the alerter module 10 is configured to not change the alert setting such that the alert is heard through the speaker 35 although the recipient communication device 105 has operatively connected to the power source 205 for the set period of time; in this case, the alerter module 10 is configured to recognize utilization of the recipient communication device 105 and/or connected device 110, and wait for another set period of time without any utilization. After again waiting and/or receiving an update from the detection module 5 after the set period of time of being operatively connected to the power source 205 without utilization of the recipient communication device 105, the alerter module 10 can automatically change the alert setting such that the alert is heard through the speaker 35 in place of the connected device 110.

In FIG. 2, the recipient communication device 105 may operatively connect to a local network interface 210 in the environment 200, e.g., such as an office or home.

The local network interface 210 may include an Ethernet connection and/or a wireless connection, e.g., WiFi, via a wireless adapter 215, such as a wireless router or a wireless access point. The wireless adapter 215 may be connected to a computer system 220. The computer system 220 may be a media hub, digital media controller, digital media server, etc. The wireless adapter 215 may be separate from or integrated with the computer system 220. The detection module 5 is configured to detect the operative connection with the local network interface 210 and notify the alerter module 10. The computer system 220 includes a network manager 225 that is configured to work in cooperation with the alerter module 10. The alerter module 10 is configured to push and pull data from the network manager 225, and the network manager 225 is configured to push and pull data from the alerter module 10.

The network manager 225 of the computer system 220 is configured to interface with an intercommunication system 230 via a local network 245. The local network 245 may be a wired and/or wireless communications network as understood by one in the art. The intercommunication system 230 may be an intercom system that operates in and/or runs throughout the environment 200 whether inside/outside a home or office, the intercommunication system 230 may be an audio system for playing music that is connected to a home entertainment system, and/or the intercommunication system 230 may be any type audio system capable of playing sound. The network manager 225 is configured to communicate with the alerter module 10 and/or the detection module 5. When the detection module 5 detects the operative connection of the recipient communication device 105 to the local network interface 210, the detection module 5 notifies the alerter module 10. The alerter module 10 is configured to modify the method of alerting the user in response to the notification from the detection module 5 indicating the connection to the local network interface 210. The alerter module 10 can automatically change the alert setting for the alert method from, e.g., the speaker 35 or connected device 110 to the intercommunication system 230. Also, the alerter module 10 can automatically change the alert setting such that the intercommunication system 230 is added as an additional alert method.

Accordingly, when an incoming call or message from the calling communication device 115 is received by the recipient communication device 105, the alerter module 10 in cooperation with the network manager 225 is configured to cause the alert, e.g., ring, for the incoming call or message to be heard through the intercommunication system 230 in place of or along with the speaker 35 and connected device 110. As a non-limiting example, the alerter module 10 may transmit a signal to the network manager 225 to cause the network manager 225 via the local network 245 to sound an audible alert through the intercommunication system 230 for the user to hear. For example, if the user is upstairs and the recipient communication device 105 is downstairs on vibrate or any non-audible setting, the alerter module 10 is configured to cause the alert to be heard through the intercommunication system 230 by automatically changing alert setting from non-audible to audible and by automatically adding the intercommunication system 230 as an additional alert method.

It is contemplated that the alert played through the intercommunication system 230 can be set up to play any audible sound that may be stored in a memory 250 of the computer system 220, and the network manager 225 causes the alert to sound through the intercommunication system 230 via the local network 245. Also, the alert module 10 can cause the alert to sound through the intercommunication system 230. In exemplary embodiments, many different alert sounds can be stored in the memory 250, and the alert is not limited to the sound of a ringer. The user can utilize the network manager 225 and/or the alerter module 10 to configure a particular alert for particular callers. Also, the alerter module 10 and/or the network manager 225 can be configured not to allow an incoming call or message from certain callers to be alerted through the intercommunication system 230 while allowing calls from other callers to be alerted through the intercommunication system 230. For example, while the intercommunication system 230 is added as an alert method via the local network interface 210, the alerter module 10 is configured to recognize callers, e.g., by calling name, telephone number, IP address, and/or a specified list stored in the database 15 whose call or message should not be alerted through the intercommunication system 230 and/or a lighting system 235 as discussed herein. As such, the alerter module 10 is configured so that every incoming message or call is not heard through the intercommunication system 230. Also, the alerter module 10 may be configured so that alerts for important callers, e.g., listed in the phone book stored in the database 15 and/or listed in a special list for additional methods of delivering alerts are provided through the intercommunication system 230 and/or the lighting system 235 while other callers not listed are not provided through the intercommunication system 230 and/or the lighting system 235. For example, the alerter module 10 and/or the network manager 225 can be configured to only allow incoming calls or messages from certain callers, e.g., husband, wife, child, mom, dad, and/or names stored in the phone book of the received communication device 105 to be heard through the intercommunication system 203 and/or the lighting system 235, while other incoming calls or messages are alerted through the speaker 35 and/or connected device 110.

In accordance with exemplary embodiments, the network manager 225 of the computer system 220 is configured to interface with the lighting system 235 via the local network 245. The lighting system 235 can be or represent the lights in an office/home, the lights in a room, an individual lamp, outside lights, upstairs/downstairs lights, a power adapter interface, and/or any operable system lights. The network manager 225 is configured to turn on and off power to the lighting system 235, to vary the intensity of the lighting system 235, to flash, e.g., quickly turn on then turn off, the lights of the lighting system 235, and/or to select and turn on a particular color of the lighting system 235. When the detection module 5 detects that the recipient communication device 105 is operatively connected to the local network interface 210, the detection module 5 notifies the alerter module 10. In response to the notification, the alerter module 10 in cooperation with the network manager 225 is configured to change the alert method from, e.g., ringing through the speaker 35 or the connected device 110 to the alert method for the lighting system 235. Additionally, the alerter module 10 in cooperation with the network manager 225 is configured to add an additional alert method to the speaker 35 and/or the connected device 110 by causing the lights of the lighting system 235 to, e.g., flash with each ring, causing the lights of the lighting system 235 to turn on or off, causing the intensity of the lights of the lighting system 235 to increase and/or decrease, and/or causing a specific color such as a red, blue, green, or yellow light bulb light of the lighting system 235 to illuminate. For example, the lighting system 235 may include a particular color light, such as green, blue, red, yellow, orange in addition to its normal light, and the alerter module 10 and/or network manager 225 can cause the particular color light to illuminate when an incoming call or message is being received at the recipient communication device 105.

In accordance with exemplary embodiments, the network manager 225 of the computer system is configured to interface with a display device 240, which may be connected to a set top box as known in the art via the local network 245. The display device 240 may connect to the local network 245 via the set top box or the functionality of the set top box may be integrated with the display device 204. In exemplary embodiments, the detection module 5 and/or the alerter module 10 may receive a notification from the network manager 225 and/or recognize that the display device 240 is displaying uninterruptible programming. The network manager 225 can be set up to recognize, or can recognize by default, uninterruptible programming identified by the user. Rules for uninterruptible programming can be stored in the memory 250 and can be set based on time intervals of the day and/or days of the week, and the network manager 225 may communicate to the alerter module 10 that an uninterruptible program is being displayed on the display device 240 between 8:00 p.m. to 9:00 p.m. When the alerter module 10 receives a notification of uninterruptible programming for a duration of time, the alerter module 10 is configured to automatically change the alert setting to a non-audible setting, which includes a non-audible method for delivering the alert as discussed herein, for the duration of time for the uninterruptible programming. Further, in response to the alerter module 10 receiving a notification indicating that the duration has concluded for the uninterruptible programming and/or if the alerter module 10 determines that the duration of the uninterruptible programming has concluded for the duration of time, the alerter module 10 automatically changes the alert setting to a previous setting, such as an audible setting. The alerter module 10 may determine that the duration has concluded for the uninterruptible programming based on the current start time and proposed ending time of the uninterruptible programming by utilizing an internal clock of the recipient communication device 105.

Further, in exemplary embodiments, the alerter module 10 is configured to periodically, such as every 5, 10, 15, and/or 40 minutes, check with the network manager 225 to determine if uninterruptible programming is still being displayed. When the uninterruptible programming is not being displayed, such as during a commercial and/or when the user changes the channel, the network manager 225 notifies the alerter module 10 to change the alert setting to include an audible alert. When the uninterruptible programming is being displayed again on the display device 240, the network manager 225 notifies the alerter module 10 to change back to a non-audible method of alert.

Also, uninterruptible programming can be automatically set based on whether a movie, e.g., pay per view, on demand, DVD, DVR, etc., is being displayed and/or whether a game, e.g., football or basketball, is being displayed on the display device 240. Also, the rules for the uninterruptible programming stored in the memory 250 may be set based on a season finale, a last episode, or some other indication that the uninterruptible programming being displayed is important. When the network manager 225 notifies the recipient communication device 105 that the uninterruptible programming is being displayed on the display device 240, the alerter module 10 can set the alert volume level 300 shown in FIG. 3 to a lower volume setting, can set the alert volume level 300 to mute, and/or can change an audible alert to a non-audible alert such that the user is not interrupted by a loud ring of the speaker 35 and/or the intercommunication system 230. When uninterruptible programming is not being displayed, however, the alerter module 10 and/or the network manager 225 contain logic to allow the recipient communication device 105 and/or the intercommunication system 203 to ring, e.g., during the news, commercials, and/or any other programming that is determined not to be important. Also, via an interface of the network manager 225, a remote controller or keyboard may be used to explicitly select an icon indicating uninterruptible programming and/or go to a menu to select uninterruptible programming on the display device 240. In exemplary embodiments, uninterruptible programming may include any type of media and is not limited to broadcast programming, multicast streaming media, unicast streamlining media, audio, gaming session, etc.

Also, when the recipient communication device 105 receives an incoming call or message, the alerter module 10 in cooperation with the network manager 225 causes an icon of, e.g., a telephone to be displayed on the display device 240, a telephone number, and/or name to be displayed on the display device 240, and/or causes a ring through speakers associated with the display device 240.

Further, in exemplary embodiments, the alerter module 10 is configured to allow the user to be alerted of an incoming call or message by transmitting alerts to simultaneously utilize all of the alert methods discussed herein. For example, when the recipient communication device 105 receives an incoming call or message, which may be from an important caller, such as, mother, father, wife, husband, children, etc., the alerter module 10 is configured to cause the speaker 35 to ring, the intercommunication system 230 to ring, the lighting system 235 to flash, and/or the display device 240 to display a phone icon, or any combination of the alert methods. Accordingly, the user may be alerted of a call or message using one or more of the combined alerting methods discussed herein, which helps to ensure that the user is alerted of the call or message. The alerter module 10 is configured to utilize one or more of the combined alerting methods in response to the recipient communication device 105 being operatively connected to the power source 205.

Further, in accordance with exemplary embodiments, the recipient communication device 105 may include a motion detector 45. The motion detector 45 is a device that may contain a physical mechanism or electronic sensor for quantifying motion. That is, the motion detector 45 detects the presence of a moving object within its field of view. An electronic motion detector contains a motion sensor that transforms the detection of motion into an electric signal. This can be achieved by measuring optical or acoustical changes in the field of view. The motion detector 45 may include passive infrared sensors (PIR) that look for body heat; active ultrasonic sensors that send out pulses and measure the reflection off a moving object; and/or active microwave sensors that send out microwave pulses and measure the reflection off a moving object.

In accordance with exemplary embodiments, the motion detector 45 may not detect motion, e.g., in a room, or nearby for a period of time, such as 30 minutes or whatever amount of time that is set in the database 15. The user can set the period of time as desired. The motion detector 45 notifies the alerter module 10. In response to the notification, the alerter module 10 is configured to check the alert setting of the recipient communication device 105. For example, the alert setting may be set to a non-audible alert, such as flash the screen, vibrate, or silent. The alerter module 10 is configured to automatically change the alert setting from the non-audible alert to an audible alert such as ring, based on the motion detector 45 not detecting motion near the recipient communication device 105 for a period of time, e.g., 30, 45, 60, 90, 120, or 180 minutes. If motion is subsequently detected by the motion detector 45, the alerter module 10 is notified, and the alerter module 10 can change the alert setting back to a non-audible setting, or the alerter module 10 can leave the alert setting at the audible alert setting. In addition to changing the alert setting from the non-audible setting to the audible setting, the alerter module 10 can add one or more additional alert methods such that the user can be alerted by the speaker 35, the lighting system 235, the display device 240, and the intercommunication system 230.

Additionally, in exemplary embodiments, the recipient communication device 105 may include a Global Positioning System (GPS) receiver 50 that receives GPS signals to determine present location. The GPS receiver 50 is configured to detect when the recipient communication device 105 itself has not moved for a period of time, such as 30, 45, 60, 90, and/or 120 minutes. In exemplary embodiments, the alerter module 10 is configured to receive notifications from the GPS receiver 50 when the recipient communication device 105 has not moved for the set period of time. Additionally or alternatively, the detection module 5 is configured to check for and receive notifications when the recipient communication device 105 has not moved for the set period of time, and then notify the alerter module 10. In response to the alerter module 10 receiving the notification that the recipient communication device 105 has not moved for the period of time, the alerter module 10 is configured to check the alert setting for the recipient communication device 105. If the alert setting is set to a non-audible setting, such as vibrate, flash the screen, or silent mode, the alerter module 10 is configured to automatically change the alert setting from the non-audible setting to an audible setting. Accordingly, the recipient communication device 105 is configured to ring through the speaker 35 by the alerter module 10, in response to receiving the notification from the GPS receiver 50 indicating that the recipient communication device 105 has not moved for the period of time. In addition to alerting through the speaker 35, in response to receiving the notification from the GPS receiver 50 indicating that the recipient communication device 105 has not moved for the period of time, the alerter module 10 can cause the network manager 225 to cause one or more of the intercommunication system 230, the lighting system 235, and the display device 240 to alert the user of a call or message, as discussed herein. Also, the alerter module 10 is configured to check whether the user has selected not to change the alert setting in response to detecting no movement by the GPS receiver 50 for the period of time, detecting the connection to the power adapter 40, detecting no motion by the motion detector 45, detecting the connection to the local network interface 210, and/or detecting the connected device 110. If enabled, the alerter module 10 does not change the alert setting accordingly.

Figure 3:
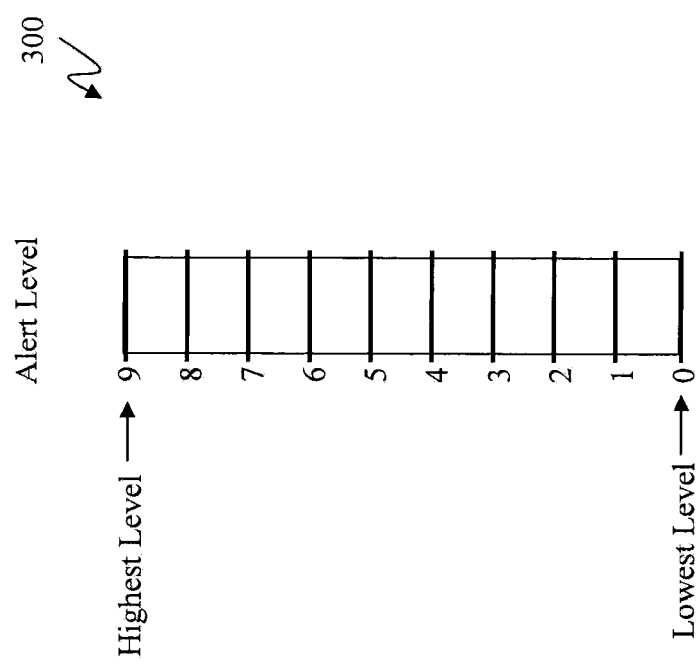
FIG. 3 illustrates an example alert volume level in accordance with exemplary embodiments.

Referring to FIG. 3, in addition to the alert level 300 being a pictorial representation of how the volume of the speaker 35, connected devices 110, and the intercommunication system 230 can be adjusted, the alert level 300 is an example of a scale that can be utilized to adjust the magnitude of the alert for any of the alerting methods discussed herein. For example, the alert level 300 may be utilized to control the brightness, intensity, color, and/or shade of the display device 240 when the display device 204 is utilized to present an alert. When an incoming message or call is received at the recipient communication device 105, the alerter module 10 and/or the network manager 225 may automatically manipulate the alert volume level 300 to increase or decrease the brightness, increase or decrease the intensity, change the color, and/or change the shade of the picture displayed on the display device 240, or any combination thereof For example, to alert the user of an incoming call or message, the picture may change from color to black and white, the brightness of the picture may decrease or increase, and/or the shade of the picture may change. Also, to alert the user of the incoming call or message, the alerter module 10 and/or the network manager 225 may automatically manipulate the alert level 300 to cause the picture of the display device 240 to blink with each ring, and/or to cause the picture to blink with a predetermined pattern indicative of the alert. The alert level 300 may be utilized to adjust the amount of space that an alert, such as a phone icon, encompasses on the display device 240, and the highest level on the alert level 300 indicates the most space and the lowest level indicates the least space. Also, the alert level 300 can be utilized to indicate the placement of the phone icon on the display device 240, and moving the alert level 300 up or down the scale changes the location of the phone icon on the display device 240.

Also, the alert level 300 may be utilized to control the brightness, intensity, color, shade, blinking, and/or pattern of lights of the lighting system 235. For example, when an incoming message or call is received at the recipient communication device 105, the alerter module 10, the network manager 225, and/or the controller 410 may automatically manipulate the alert volume level 300 to increase or decrease the brightness, increase or decrease the intensity, change the color of the lights of the lighting system 235, and/or change a blinking pattern of the lights, or any combination thereof For example, the various levels on the alert volume 300 may represent different color lights of the lighting system 235. Also, the various levels on the alert volume 300 may represent different blinking patterns, such as very slow, slow, medium, fast, and very fast, for lights of the lighting system 235. Also, the blinking pattern may include various combinations, such as slow blinks then fast blinks, fast blinks then slow blinks, etc. The alert level 300 may be implemented by the alert module 300, the network manager 225, and/or a controller 400 shown in FIG. 4.

Figure 4:
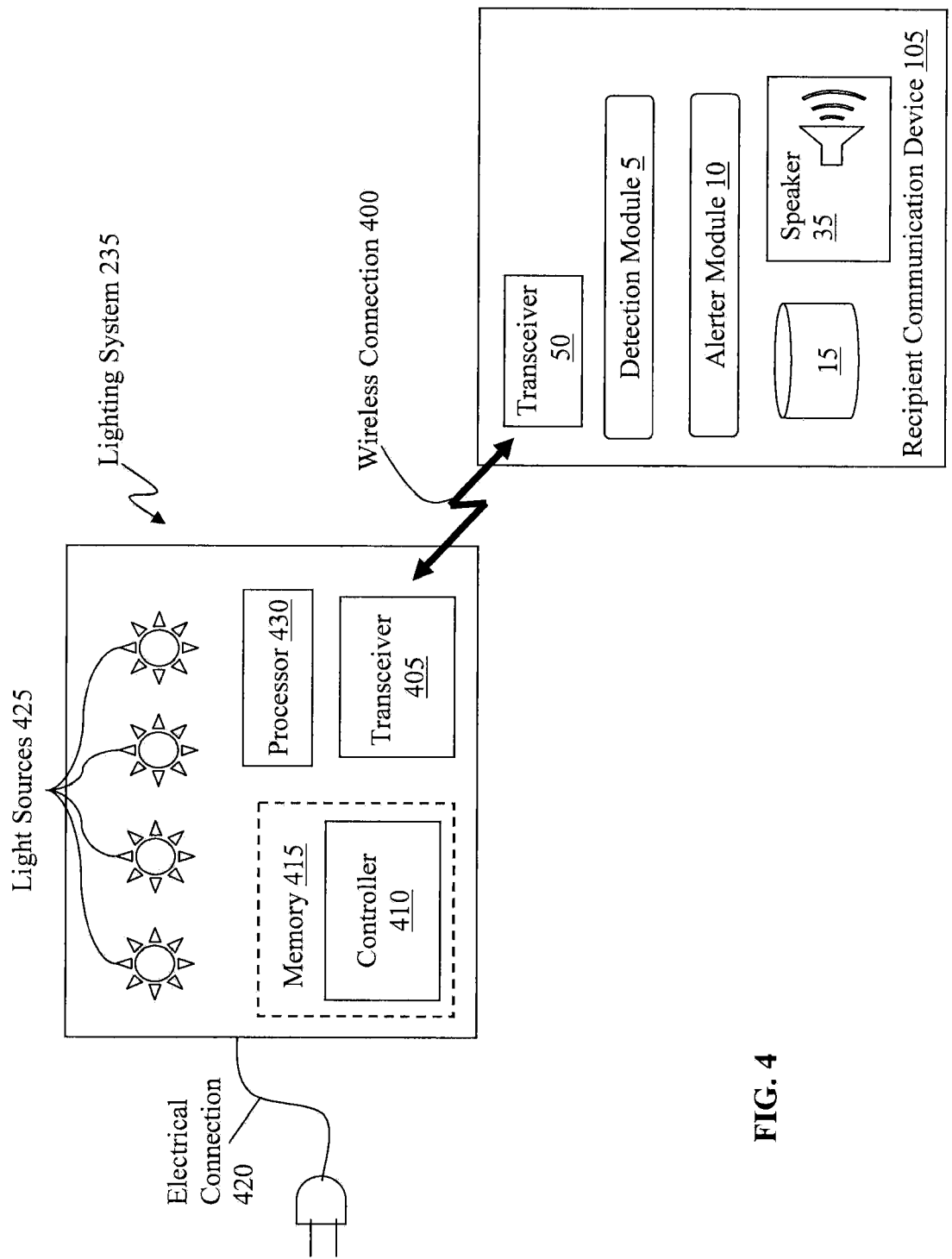
FIG. 4 illustrates an example of a lighting system in accordance with exemplary embodiments.

FIG. 4 illustrates an example of the lighting system 235 in accordance with exemplary embodiments. The lighting system 235 in FIG. 4 illustrates further details in accordance with exemplary embodiments. The lighting system 235 may be the lights in one or more offices, the lights in one or more rooms in a home, such as a single lamp, multiple lamps, a single light fixture, and/or multiple light fixtures and/or the lights in a vehicle, such as an overhead light, reading light, sun visor light, and/or interior side door light. Also, the lighting system 235 may be the upstairs lights in a home, the downstairs lights in a home, both upstairs and downstairs lights in a home, exterior lights, and/or lights in a garage. Further, the lighting system 235 may be implemented as an intelligent plug power adapter that controls the lights of the lighting system 235, and when the lighting system 235 is the intelligent plug power adapter, the intelligent power adapter connects to an AC power outlet to manipulate power to the light sources 425.

In FIG. 4, the lighting system 235 may include a transceiver 405 for transmitting and receiving signals and data. The transceiver 405 can be wirelessly connected to a transceiver 50 of the recipient communication device 105 via a wireless connection 400. The lighting system 235 may include a controller 410, which may be an application specific circuit, for controlling and regulating electrical power to the lighting system 235. Also, the controller 410 may be implemented as executable instructions or a program stored in memory 415 for controlling and regulating electrical power to the lighting system 235; the executable instructions or program of the controller 410 can be executed by a processor 430 of the lighting system 235. It is understood that example implementations of the lighting system 235 are not meant to be limiting.

The controller 410 regulates electrical current from, e.g., the electrical connection 420 to the lighting system 235. Accordingly, the controller 410 regulates one or more light sources 425. The light sources 425 can be any type of light, such as an incandescent light bulb, light emitting diode (LED), fluorescent light bulb including compact fluorescent lamps (CFLs), and/or any combination thereof The detection module 5 is configured to detect the wireless connection 400 of the recipient communication device 105 to the lighting system 235. Also, the detection module 5 can detect that the lighting system 235 is available, and the detection module 5 can cause the transceiver 50 of the recipient communication device 105 to operatively connect to the transceiver 405 of the lighting system 235. The detection module 5 notifies the alerter module 10, and the alerter module 10 can automatically change the alert setting of the recipient communication device 105 so that the alert is additionally or alternatively provided through the lighting system 235 as discussed herein.

For example, when the recipient communication device 105 receives an incoming call or message, the alerter module 10 is configured to cause an alert of the incoming communication to be alerted through the lighting system 235. The transceiver 50 may transmit an alert signal to the transceiver 405. The transceiver 405 communicates with the controller 410 to indicate that the alert signal is received from the recipient communication device 105. The controller 410 causes the light source 425 to indicate that the incoming communication is being received by the recipient communication device 105. For example, the controller 410 may increase or decrease the intensity of the light sources 425, may turn off one or more of the light sources 425, may turn on one of the light sources 425 that is a particular color, such as red, blue, green, yellow, etc., may flash the light sources 425 by rapidly turning on and turning off power to the light sources 425, and may cause one or more of the light sources 425 to blink according to a specific pattern.

In exemplary embodiments, the light sources 425 may represent a particular light in each room of a home. For example, the light sources 425 may be one light in the kitchen, one light in the living room, one light in the garage, and/or one light in the bathroom, and the alerter module 10 is configured to cause the alert via the controller 410 of receiving a communication to be provided through the light sources 425, such that the light sources 425 visibly indicate that a communication is being received. The light sources 425 can represent any type of light and can be any location, such as one or more of the lights in the kitchen, living room, garage, and bathroom.

As an example, one of the light sources 425 may be an LED for alerting the user about a call or message, while the other light sources 425 are incandescent light bulbs or florescent light bulbs that do not alert the user of the call or message received at the recipient communication device 105. When the alerter module 10 automatically changes the alert method of the alert setting because the alerter module 10 recognizes the wireless connection 400, the alerter module 10 automatically causes the controller 410 to provide the alert only through the LED light source 425 but not through the incandescent light bulb light source 425. Similarly, the alerter module 10 can provide the alert only through the incandescent light bulb light source 425 but not through the LED light source 425.

Figure 5:
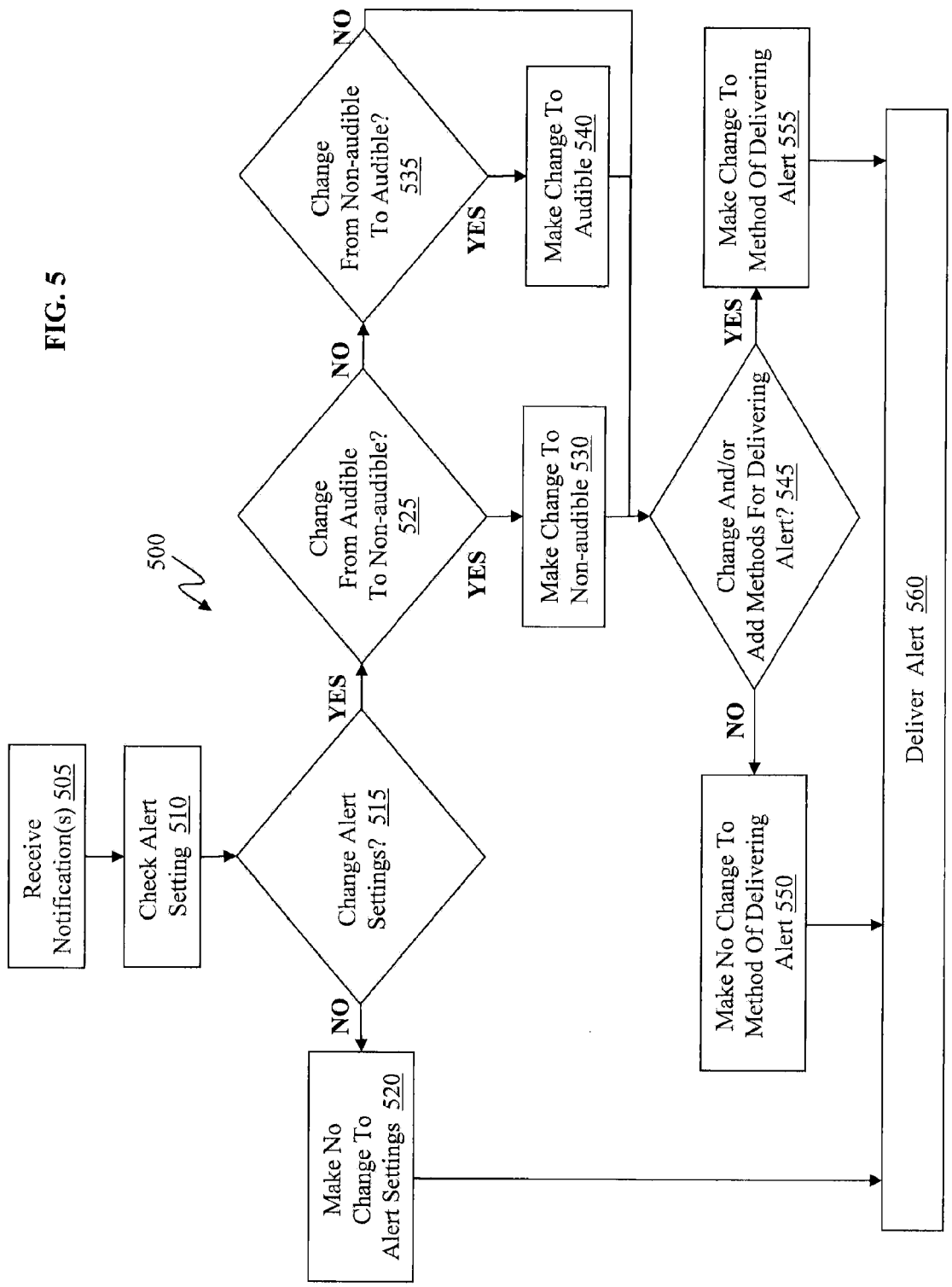
FIG. 5 illustrates a flow diagram in accordance with exemplary embodiments.

FIG. 5 illustrates a flow diagram 500 in accordance with exemplary embodiments. The alerter module 10 of the recipient communication device 105 may receive various notifications as discussed herein at 505. For example, the detection module 5 may send a notification to the alerter module 10 indicating that the power adapter 40 is operatively connected to the power source 205. The detection module 5 may send a notification to the alerter module 10 indicating that the GPS receiver 50 detects no movement of the recipient communication device 105 which may be for a particular period of time, such as 30, 45, 60, 90, 120, and/or 180 minutes, and/or the GPS receiver 50 may send the notification directly to the alerter module 50. The detection module 5 may send a notification to the alerter module 10 indicating that the motion detector 45 detects no movement nearby or around the recipient communication device 105, which may be for a particular period of time, such as 30, 45, 60, 90, 120, and/or 180 minutes, and/or the motion detector 45 may send the notification to the alerter module 10. The detection module 5 may send a notification to the alerter module 10 indicating that the connected device 110 is operatively connected to the recipient communication device 105. The detection module 5 may send a notification to the alerter module 10 indicating that the local network interface 210 is operatively connected to the recipient communication device 105, and the local network interface 210 via the network manager 225 communicates to the alerter module 10 the additional alert methods that can be added. Also, the detection module 5 may send a notification to the alerter module 10 indicating that the lighting system 235 is operatively connected via the wireless connection 400 to the recipient communication device 105 as shown in FIG. 4 and/or is operatively connected via the local network interface 210 to the recipient communication device 105. Further, the detection module 5 and/or the network manager 225 may send a notification to the alerter module 10 that the display device 240 is displaying uninterruptible programming.

Responsive to receiving the notifications, the alerter module 10 checks the status of the alert setting for the recipient communication device 105 to determine the current alert setting at 510.

The alerter module 10 is configured to automatically determine whether the alert setting of the recipient communication device 105 should be changed based on one or more notifications that have been received at 515.

If the alerter module 10 determines that the alert setting of the recipient communication device 105 should not be changed, the alerter module 10 makes no changes to the alert setting at 520.

If the alerter module 10 determines that the alert setting of the recipient communication device 105 should be changed, the alerter module 10 is configured to determine whether to change the alert setting from an audible setting to a non-audible setting based on the received notifications at 525. If YES, the alerter module 10 automatically changes the alert setting to a non-audible setting at 530. If NO, the alerter module 10 is configured to determine whether to change the alert setting from a non-audible setting to an audible setting based on the received notifications at 535. If YES, the alerter module 10 automatically changes the alert setting to an audible alert setting at 540. If NO, the alerter module 10 does not change the alert setting to an audible alert setting, and the flow branches to block 545.

The alerter module 10 is configured to determine whether the alert setting should be modified to change the alert method for delivering the alert and/or to add additional methods for delivering the alert based on the received notifications at 545. For example, the alerter module 10 can automatically add and/or change the alert method for delivering the alert by providing the alert through the intercommunication system 230, the lighting system 235, the display device 240, the connected device 110, and/or the speaker 35, and any combination thereof. Moreover, the alerter module 10 is configured to automatically cause the alert to be delivered through each one of the previous alert methods at the same time to alert the user of a call or message.

If the alert method for delivering the alert should not be changed, the alerter module 10 makes no change to the alert setting to change the alert method for delivery at 550.

If the alerter module 10 determines that the alert method for delivering the alert should be changed, the alerter module 10 is configured to automatically change the alert method for delivering the alert accordingly at 555.

In response to a call or message at the recipient communication device 105, the alerter module 10 delivers the alert at 560.

In exemplary embodiments, the various notifications received by the alerter module 10 are not user initiated. That is, the alerter module 10 can receive notifications from the detection module 5, the GPS receiver 50, the motion detector 45, the local network interface 210, and/or the lighting system 235 without requiring user input or initiation, and the alerter module 10 is configured to automatically change the alert setting based on the received notifications in accordance with exemplary embodiments.

Further, the alerter module 10 is configured to automatically change the alert setting as discussed herein based on being connected to any connected devices, such as being operatively connected to the connected devices 110, the network interface 210, the computer system 220, the lighting system 235, the power adapter 40, and/or the intercommunication system 230.

It is understood by one skilled in the art that each element such as the devices, modules, systems, interfaces, adapters, networks, controllers, computers, etc., described in the present disclosure contains all the necessary hardware, software, and/or firmware to operate and function as discussed herein in accordance with exemplary embodiments.

Figure 6:
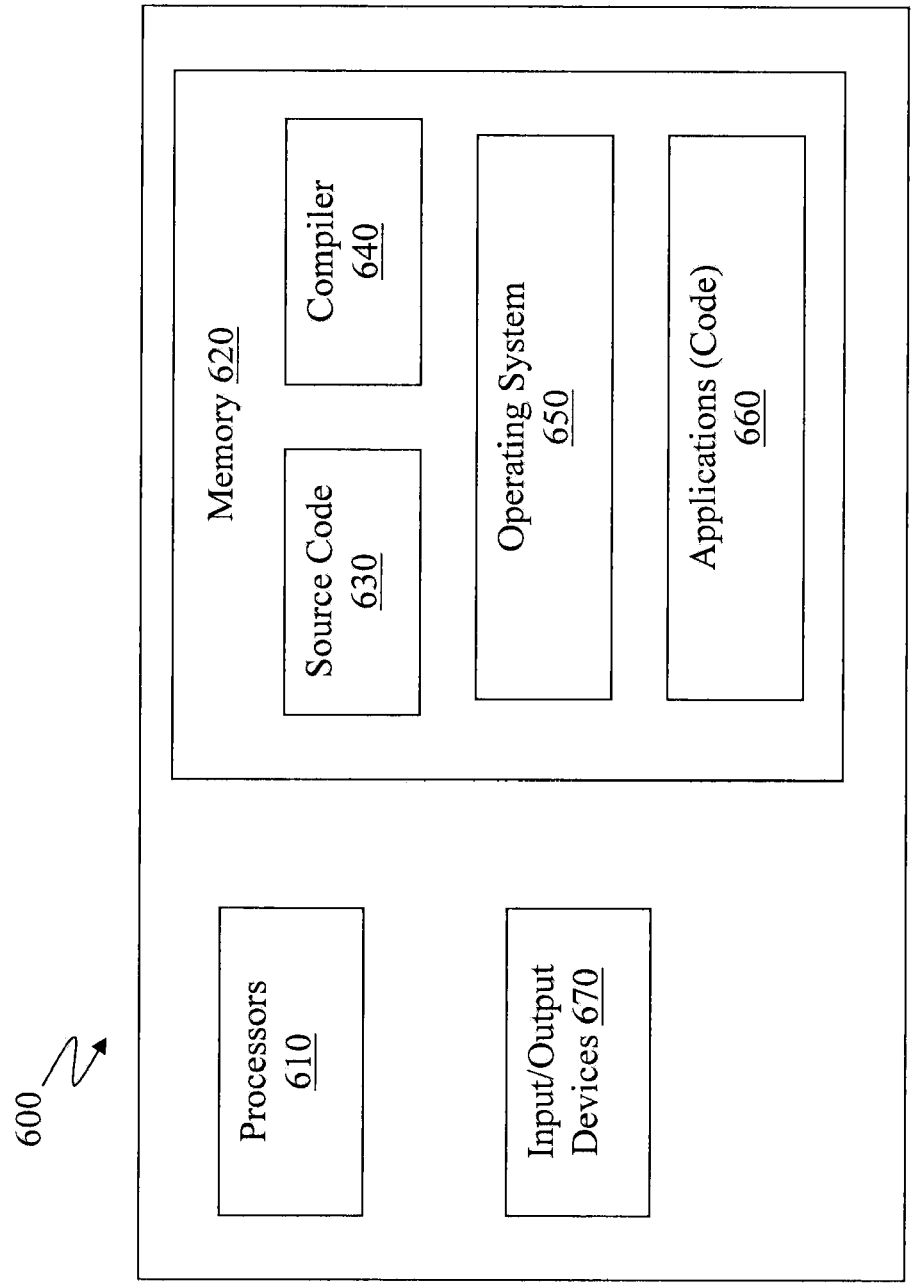
FIG. 6 illustrates an example of a computer having elements used in implementing exemplary embodiments.

FIG. 6 illustrates an example of a computer 600 having one or more elements that may be utilized in implementing the recipient communication device 105, the connected devices 110, the calling communication device 115, the local network interface 210, the intercommunication system 230, the lighting system 235, the display device 240, and the computer system 220 in accordance with exemplary embodiments. The computer 600 includes, but is not limited to, PCs, workstations, systems, laptops, PDAs, palm devices, servers, mobile devices, communication devices, cell phones, computer systems, set top boxes (STB), televisions (TV), game consoles, MP3 players, and the like. The computer 600 may include a processor 610, memory 620, and one or more input and/or output (I/O) 670 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. In the example illustrated in FIG. 6, the software in the memory 620 includes a suitable operating system (O/S) 650, compiler 640, source code 630, and one or more applications 660 (or modules) of the exemplary embodiments.

The operating system 650 controls the execution of other computer programs, and provides scheduling, input-output control, file and data management, memory management, and communication control and related services. It is contemplated by the inventors that the application 660 for implementing exemplary embodiments is applicable on all other commercially available operating systems.

The application 660 may be a source program, executable program (object code), script, or any other entity comprising a set of instructions to be performed. When a source program is to be executed, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, remote controller, camera, biometric input device(s), a vibrator device for non-audible alert, etc. Furthermore, the I/O devices 670 may also include output devices, for example but not limited to, a printer, display, speaker, etc. Also, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 include may include modems, gateways, receivers, transmitters, transceivers, etc. for communicating over a communications network.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software, it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable medium can be stored, communicated, propagated, or transported for use by or in connection with the instruction execution system, apparatus, or device.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits. It is understood that computer program code can be transmitted over some transmission medium, loaded into and/or executed by a computer, or transmitted over some transmission medium, such as over electrical wiring or cabling, through fiber optics, or via electromagnetic radiation.

While features have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the present disclosure without departing from the essential scope thereof Therefore, it is intended that the present disclosure not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for changing an alert setting of a communication device, comprising:
    detecting an operative connection of the communication device to a connected device;
    based on the operative connection to the connected device, determining whether the alert setting for the communication device should be changed;
    wherein the connected device is in communication with a lighting system of a home;
    automatically changing the alert setting to flash the lighting system of the home when an incoming communication is received;

wherein the alert setting of the communication device causes the lighting system of the home to flash with each ring of the communication device; and flashing the lighting system of the home based on the incoming communication being from predefined callers, based on the communication device determining that the predefined callers are stored in a database in the communication device;

preventing the incoming communication from flashing the lighting system based on the incoming communication being from other callers, responsive to the communication device determining that the incoming communication is from the other callers not in the database.

2. The method of claim 1, further comprising in response to the connected device being a network interface, causing the ring of the incoming communication to the communication device to be provided through the network interface;

in response to an intercommunication system being connected to the network interface, causing the ring of the incoming communication to be heard through the intercommunication system based on the incoming communication being from the predefined callers in the database while blocking the ring of the incoming communication from being heard through the intercommunication system based on the incoming communication being from other callers not in the database;

wherein the intercommunication system is external to the communication device and the intercommunication system comprises an audio system for playing sound throughout a home environment.

3. The method of claim 2, further comprising in response to a lighting system of a room being connected to the network interface, causing the ring of the incoming communication to be provided by flashing lights of the lighting system of the room based on a setting, turning on lights of the lighting system of the room based on the setting, turning off lights of the lighting system of the room based on the setting, and turning on a particular color light of the lighting system of the room based on the setting.

4. The method of claim 1, wherein the predefined callers are stored in the database and the other callers are absent from the database.

5. The method of claim 1, further comprising receiving by the communication device a notification from a network interface that uninterruptible programming is being displayed on a display device for a time duration, wherein the uninterruptible programming is indentified by a user;

in response to fulfilling rules for the uninterruptible programming being displayed on the display device according to the notification from the network interface, automatically setting the alert setting to non-audible for the time duration of the uninterruptible programming;

in response to the communication device receiving another notification indicating that the time duration for the uninterruptible programming has concluded, automatically changing the alert setting to a previous alert setting.

6. The method of claim 1, wherein when the connected device is a headset, automatically changing the alert setting from the ring to a beep.

7. The method of claim 1, wherein when the connected device is a power adapter, automatically changing the alert setting from a non-audible setting to an audible setting.

8. A method for changing an alert setting of a cell phone, comprising:

receiving a notification of an incoming communication at the cell phone;

wherein the cell phone is connected to a lighting system of a home via a network;

in response to receiving the notification, automatically changing the alert setting to flash the lighting system of the home when the incoming communication is received;

wherein the alert setting of the cell phone causes the lighting system of the home to flash with each ring of the cell phone;

flashing the lighting system of the home based on the incoming communication being from predefined callers, based on the cell phone determining that the predefined callers are stored in a database in the cell phone;

preventing the incoming communication from flashing the lighting system based on the incoming communication being from other callers, responsive to the cell phone determining that the incoming communication is from the other callers not in the database.

9. A communication device configured to change an alert setting for an incoming communication, comprising:

an alerter module configured to automatically change the alert setting; and a processor responsive to computer-executable instructions of the alerter module;

wherein the alerter module is configured to automatically change the alert setting to flash a lighting system of a home when the incoming communication is received;

wherein the alert setting causes the lighting system of the home to flash with each ring; and wherein flashing the lighting system of the home is based on the incoming communication being from predefined callers, based on the processor determining that the predefined callers are stored in a database;

preventing the incoming communication from flashing the lighting system is based on the incoming communication being from other callers, responsive to the processor determining that the incoming communication is from the other callers not in the database.

10. A computer program product, tangibly embodied on a computer readable medium, the computer program product including instructions for causing a cell phone to execute a method for changing an alert setting of the cell phone, comprising:

receiving a notification of an incoming communication at the cell phone;

wherein the cell phone is connected to a lighting system of a home via a network;

in response to receiving the notification, automatically changing the alert setting to flash the lighting system of the home when the incoming communication is received;

wherein the alert setting of the cell phone causes the lighting system of the home to flash with each ring of the cell phone; and flashing the lighting system of the home based on the incoming communication being from predefined callers, based on the cell phone determining that the predefined callers are stored in a database in the cell phone;

preventing the incoming communication from flashing the lighting system based on the incoming communication being from other callers, responsive to the cell phone determining that the incoming communication is from the other callers not in the database.

* * * * *